US011531115B2

(12) United States Patent
Sharma et al.

(10) Patent No.: US 11,531,115 B2
(45) Date of Patent: Dec. 20, 2022

(54) SYSTEM AND METHOD FOR DETECTING TRACKING PROBLEMS

(71) Applicant: Caterpillar Global Mining LLC, Tucson, AZ (US)

(72) Inventors: Manish Sharma, Peoria, IL (US); Sagar Chowdhury, Peoria, IL (US); Philip Wallstedt, Washington, IL (US)

(73) Assignee: Caterpillar Global Mining LLC, Tucson, AZ (US)

( * ) Notice: Subject to any disclaimer, the term of this patent is extended or adjusted under 35 U.S.C. 154(b) by 311 days.

(21) Appl. No.: 16/789,103

(22) Filed: Feb. 12, 2020

(65) Prior Publication Data

US 2021/0247523 A1    Aug. 12, 2021

(51) Int. Cl.

| | |
|---|---|
| *G01S 19/07* | (2010.01) |
| *G01S 19/47* | (2010.01) |
| *G01S 19/45* | (2010.01) |
| *G01C 21/16* | (2006.01) |
| *G01S 19/23* | (2010.01) |
| *G01S 19/48* | (2010.01) |

(52) U.S. Cl.
CPC .............. *G01S 19/07* (2013.01); *G01S 19/45* (2013.01); *G01S 19/47* (2013.01); *G01C 21/16* (2013.01); *G01S 19/23* (2013.01); *G01S 19/48* (2013.01)

(58) Field of Classification Search
CPC .......... G01S 19/23; G01S 19/45; G01S 19/47; G01S 19/48; G01S 19/49; G01S 19/07; G01S 5/0258; G01S 5/0263; G01C 21/16

USPC .............. 342/357.62, 357.28, 375.3, 357.31, 342/357.32, 357.44, 457
See application file for complete search history.

(56) References Cited

U.S. PATENT DOCUMENTS

| | | | |
|---|---|---|---|
| 6,901,319 B1 * | 5/2005 | Nelson | G05D 1/027 303/146 |
| 7,574,290 B2 | 8/2009 | Gibson et al. | |
| 8,078,373 B2 * | 12/2011 | Deng | B60T 7/22 477/145 |
| 8,180,513 B2 | 5/2012 | Wang et al. | |
| 8,190,330 B2 | 5/2012 | Lee | |
| 8,612,084 B2 * | 12/2013 | Hennessy | G05D 1/0278 342/36 |
| 8,855,848 B2 | 10/2014 | Zeng | |
| 9,168,924 B2 | 10/2015 | Lee et al. | |
| 9,567,004 B1 * | 2/2017 | Jhang | B62D 15/025 |

(Continued)

*Primary Examiner* — Chuong P Nguyen
(74) *Attorney, Agent, or Firm* — Lee & Hayes, PLLC

(57) ABSTRACT

A tracking problem detection system for a machine may include tracking diagnostic circuitry including one or more tracking diagnostic processors configured to receive a location signal indicative of a location of a machine and a path signal indicative of a path location associated with at least a portion of a path for the machine to follow while maneuvering. The tracking diagnostic processors may also be configured to determine a tracking difference between the path location and the location of the machine, and determine a frequency of a signal associated with the tracking difference and/or a frequency of a signal associated with a yaw rate associated with the maneuvering. The tracking diagnostic processors may also be configured to detect, based at least in part on the frequencies of the signals associated with the tracking difference and/or the yaw rate, a tracking problem associated with maneuvering the machine.

20 Claims, 9 Drawing Sheets

(56) References Cited

U.S. PATENT DOCUMENTS

| | | | |
|---|---|---|---|
| 9,945,100 B2* | 4/2018 | Friend | E02F 9/205 |
| 10,247,830 B2* | 4/2019 | Hosoya | G01S 19/49 |
| 10,761,531 B2* | 9/2020 | Matsumoto | G05D 1/0212 |
| 10,809,390 B2* | 10/2020 | Miyajima | G01S 19/49 |
| 10,845,197 B2* | 11/2020 | Knutson | G01C 25/00 |
| 2008/0039991 A1 | 2/2008 | May et al. | |
| 2009/0276111 A1* | 11/2009 | Wang | B60W 40/114 |
| | | | 701/41 |
| 2016/0221575 A1 | 8/2016 | Posch et al. | |
| 2017/0277189 A1 | 9/2017 | Johnson et al. | |
| 2019/0346280 A1* | 11/2019 | Mutschler | G06N 20/10 |
| 2020/0339134 A1* | 10/2020 | Pennala | B60W 50/0205 |
| 2021/0373566 A1* | 12/2021 | Agarwal | G05D 1/0223 |

\* cited by examiner

SYSTEM AND METHOD FOR DETECTING TRACKING PROBLEMS

TECHNICAL FIELD

The present disclosure relates to a system and method for detecting tracking problems, and more particularly, to a system and method for detecting tracking problems associated with maneuvering a machine.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. Some machines may be maneuverable across the terrain associated with the worksite and may include a system for maneuvering according to a defined travel route. However, such systems may exhibit problems following the defined travel route. For example, the machine may stray slightly or significantly from the defined travel route, which may lead to inefficiencies with operation of the machine or other problems. Further, this may result in increased down time and maintenance for the machine, which may reduce the productivity of the machine.

An attempt to provide a control system for an autonomous ground vehicle is described in U.S. Pat. No. 8,180,513 B2 to Wang et al. ("the '513 patent"), issued May 15, 2012. Specifically, the '513 patent describes a reference yaw rate generator for an autonomous ground vehicle control system. According to the '513 patent, the reference yaw rate generator is configured to generate a reference yaw rate based on an actual latitudinal position, a desired latitudinal position, an actual longitudinal position, a desired longitudinal position, and an actual heading of the autonomous ground vehicle. The control system of the '513 patent is configured to determine a desired yaw rate and provide commands to the autonomous ground vehicle to approach and/or achieve the desired yaw rate. According to the '513 patent, by adjusting the yaw rate, the system provides trajectory tracking at relatively high speeds without causing an unstable condition. In particular, the yaw rate may be adjusted to minimize a difference between the desired yaw rate and the yaw rate and/or to minimize a lateral distance between the autonomous ground vehicle and the trajectory.

Although the '513 patent purports to provide a control system for an autonomous ground vehicle, the '513 patent does not describe a system or method for detecting tracking problems associated with the control system. The systems and methods described herein may be directed to addressing one or more of the possible concerns set forth above.

SUMMARY

According to a first aspect, a tracking problem detection system for a machine may include a tracking diagnostic module including one or more tracking diagnostic processors configured to receive a location signal indicative of a location of a machine and receive a path signal indicative of a path location associated with at least a portion of a path for the machine to follow while maneuvering. The one or more tracking diagnostic processors may also be configured to determine a tracking difference between the path location and the location of the machine, and determine, based at least in part on the tracking difference, at least one of a first frequency of a first signal associated with the tracking difference associated with maneuvering of the machine or a second frequency of a second signal associated with a yaw rate associated with maneuvering of the machine. The one or more tracking diagnostic processors may also be configured to detect, based at least in part on at least one of the first frequency or the second frequency, a tracking problem associated with maneuvering of the machine.

According to a further aspect, a method for detecting a tracking problem associated with maneuvering of a machine may include receiving a location signal indicative of a location of a machine and receiving a path signal indicative of a path location associated with at least a portion of a path for the machine to follow while maneuvering. The method may further include determining a tracking difference between the path location and the location of the machine, and determining, based at least in part on the tracking difference, at least one of a first frequency of a first signal associated with the tracking difference associated with maneuvering of the machine or a second frequency of a second signal associated with a yaw rate associated with maneuvering of the machine. The method may further include detecting, based at least in part on at least one of the first frequency or the second frequency, a tracking problem associated with maneuvering of the machine.

According to another aspect, a machine may include a chassis and a tracking diagnostic module coupled to the chassis. The tracking diagnostic model may include one or more tracking diagnostic processors configured to receive a location signal indicative of a location of a machine and receive a path signal indicative of a path location associated with at least a portion of a path for the machine to follow while maneuvering. The one or more tracking diagnostic processors may also be configured to determine a tracking difference between the path location and the location of the machine, and determine, based at least in part on the tracking difference, at least one of a first frequency of a first signal associated with the tracking difference associated with maneuvering of the machine or a second frequency of a second signal associated with a yaw rate associated with maneuvering of the machine. The one or more tracking diagnostic processors may also be configured to detect, based at least in part on at least one of the first frequency or the second frequency, a tracking problem associated with maneuvering of the machine.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for detecting tracking problems associated with maneuvering a machine through an environment, such as a worksite. In some examples, the systems and/or methods may be configured to receive a location signal indicative of a location of the machine and a path signal indicative of a path location associated with at least a portion of a path for the machine to follow while maneuvering. In some examples, the systems and methods may be configured to determine a tracking difference between the path location and the location of the machine, and determine, based at least in part on the tracking difference, a frequency of a signal associated with the tracking difference associated with maneuvering of the machine and/or a frequency of a signal associated with a yaw rate associated with maneuvering of the machine. In some examples, the systems and methods may be configured to detect, based at least in part on at least one of the frequency of the signal associated with the tracking difference or the frequency of the signal associated with the yaw rate, a tracking problem associated with maneuvering of the machine, such as a tracking error. For example, due to control and/or physical problems associated with the machine, the machine may exhibit a tendency to stray from the path provided for the machine to follow, for example, in a swerving manner, which may result in the machine heading off-course, breaching lane boundaries (actual and/or virtual), and/or operating in an inefficient manner. In some examples, the swerving may occur such that the machine repeatedly crosses the path provided for the machine to follow in an oscillating manner and/or such that the machine does not cross the path provided for the machine to follow, but such that the location of the machine relative to the path oscillates without crossing the path. At least some examples of the systems and methods described herein may be able to detect such tracking problems, and corrective action may be taken to mitigate or eliminate the detected tracking problem, which may result in improving the performance and/or efficiency associated with operation of the machine.

Figure 1:
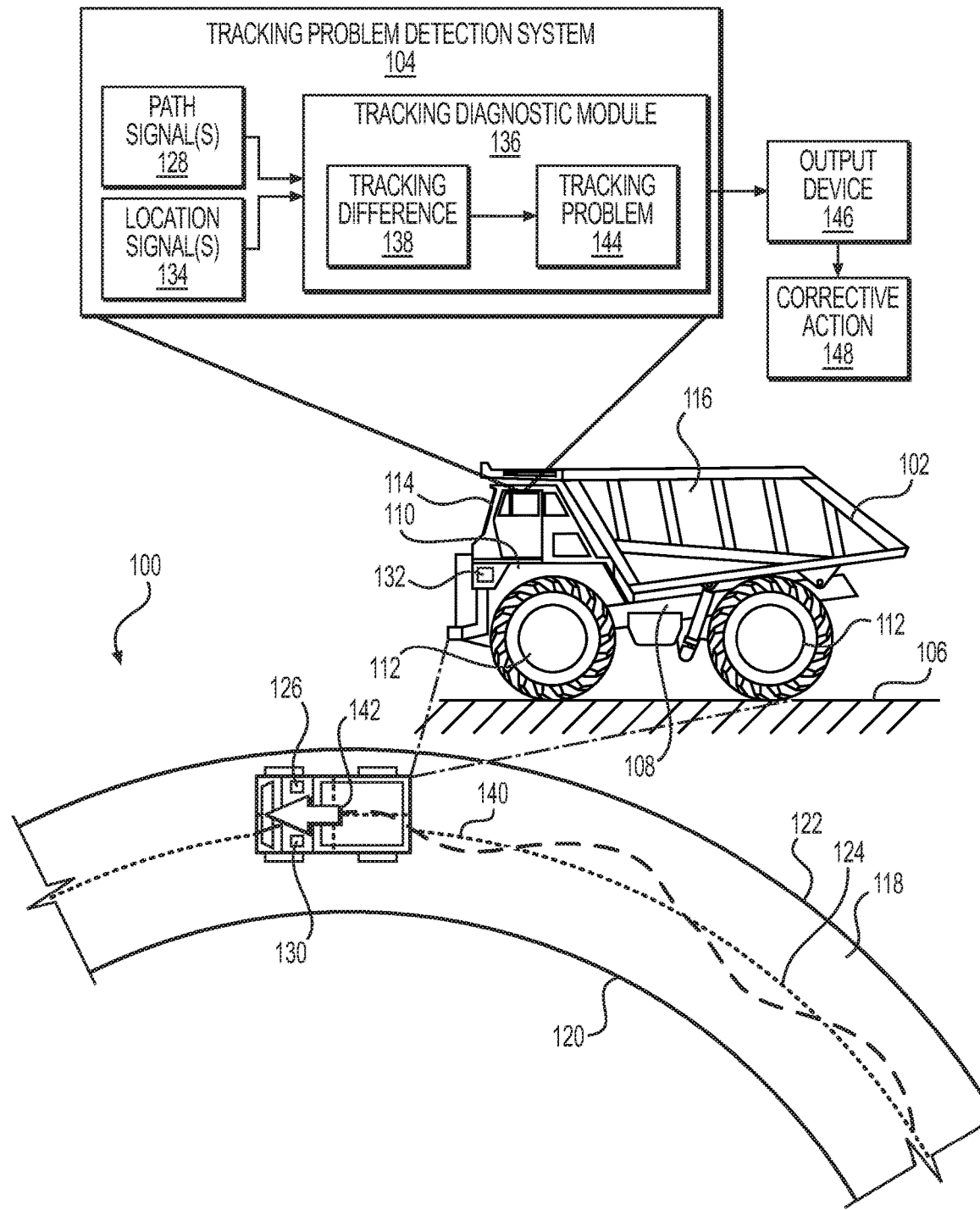
FIG. 1 is a block diagram depicting a schematic top view and a schematic side view of an example environment including a machine including the disclosed tracking problem detection system.

FIG. 1 is a block diagram depicting a schematic top view and a schematic side view of an example environment 100, such as a worksite, including an example machine 102 including an example tracking problem detection system 104 for detecting a tracking problem associated with maneuvering the machine 102. The environment 100 may include terrain 106 on which the machine 102 operates. The example machine 102 shown in FIG. 1 is a haul truck configured to move material from one location to another location. However, the machine 102 may be any type of machine configured to travel across terrain, such as an automobile, a truck, an agricultural vehicle, and/or work vehicles, such as a mining machine, a dozer, a wheel loader, a track loader, a skid-steer loader, a grader, an on-highway truck, an off-highway truck, and/or any other machine known to a person skilled in the art.

The example machine 102 shown in FIG. 1 includes a chassis 108 to which is coupled a power source 110 configured to supply power for operation of the machine 102, including, for example, operating work implements, electronics, and steering, and/or for supplying torque to drive members to propel the machine 102 across the terrain 106. For example, the machine 102 shown in FIG. 1 includes four wheels 112 coupled to the chassis 108 and configured to propel the machine 102 across the terrain 106. Although the example machine 102 includes wheels 112, it is contemplated that the machine 102 may include one or more tracks instead of, or in addition to, the wheels 112. The example machine 102 also includes a cab 114 coupled to the chassis 108 for protecting and/or providing comfort for an operator of the machine 102 and/or for protecting control-related devices of the machine 102, which may be configured to at least partially control operation of the machine 102. In some examples, the machine 102 may be semi-autonomous or fully-autonomous and able to operate without an onboard or remote operator. For example, the machine 102 may be semi-autonomous and configured be at least partially controlled with the assistance of a human operator located either remote from the machine 102 or on-board the machine 102. In some examples, the machine 102 may be substantially fully-autonomous and configured to be controlled, for example, without on-board or remotely-located assistance of a human operator. The example machine 102 also includes a work implement 116 (e.g., pivotable bed for a haul truck) for performing operations associated with the machine 102, such as carrying and/or depositing material. In other examples (e.g., when the machine 102 is a wheel loader, a dozer, a cold planer, etc.), the implement 116 may comprise a blade, bucket, auger, or other device configured to assist in digging, shaving, smoothing, moving, or otherwise acting on dirt, gravel, asphalt, or other material.

The example environment 100 shown in FIG. 1 includes a road 118 at least partially defined on either side by an edge 120 and an edge 122. The road 118 may be paved or un-paved and formed from a variety of materials, such as gravel, concrete, asphalt, soil, cinders, etc. In some examples, the edges 120 and 122 defining the road 118 may only be partially visible or completely invisible. For example, the road 118 and/or the edges 120 and/or 122 may be virtual and defined digitally, for example, based on geo-coordinates.

As shown in FIG. 1, the machine 102 may be controlled, for example, such that the machine 102 is intended to follow a path 124 while maneuvering on the road 118. For example, the machine 102 may include a receiver 126 configured to receive one or more path signals 128 indicative of a series of semi- or fully-contiguous locations along the path 124 for the machine 102 to follow while maneuvering, for example, between a departure point and a destination point, which may be associated with the road 118 and/or other roads. In some examples, the path signal(s) 128 may define a discrete portion of the path 124 between the two locations. In some examples, the machine 102 may include a travel controller 130 configured to receive the one or more path signals 128 and cause the machine 102 to follow the path 124 to maneuver along a route between the departure point and the destination point. For example, the travel controller 130 may be configured to control the power source 110 to supply power to the wheels 112 to cause the machine 102 to move at a desired velocity and/or to cause one or more steering devices coupled to the chassis 108 to cause the machine 102 to change direction of travel to follow the path 124. For example, the path signals 128 may provide a series of locations of the path 124 along the route.

In some examples, the machine 102 may include one or more sensors 132 configured to generate one or more location signals 134 indicative of the environment 100, and the travel controller 130 may be configured to determine, based at least in part on the one or more sensor signals, the location of the machine 102 (e.g., the location of a predefined point of the machine 102, such as a center of the machine 102 (e.g., a center of gravity of the machine 102 or a geometric center of the machine 102)), for example, relative to a top view of the machine 102) as the machine 102 travels along the path 124. In some examples, the travel controller 130 may be configured to substantially align the location of the machine 102 along the path 124, such that as the location of the machine 102 strays from the path 124, the travel controller 130 causes the machine 102 to alter its direction of travel, so that the location of the machine 102 substantially coincides with the path 124 at the respective locations of the machines 102 as it maneuvers according to the path 124. In some examples, the travel controller 130 may be configured maintain a difference between the location of the machine along the path 124 and the corresponding location of the path 124 at a minimum, for example, within a predetermined threshold tracking difference.

In some examples, the one or more sensors 132 may include any types of sensors configured to generate location signals 134, based on which the location of the machine 102 may be determined. For example, the one or more sensors 132 may include a global positioning system (GPS) receiver, at least one object sensor configured to generate a signal indicative of an object in an environment 100 in which the machine 102 is maneuvering. For example, the one or more sensors 132 may include one or more imagers, one or more light detection and ranging (LIDAR) sensors, one or more sound navigation ranging (SONAR) sensors, and/or one or more radio detection and ranging (RADAR) sensors. In some examples, the one or more sensors 132 may include one or more accelerometers, one or more gyroscopes, and/or one or more inertial measurement unit (IMU).

As shown in FIG. 1, some examples of the tracking problem detection system 104 may include a tracking diagnostic module 136. The tracking diagnostic module 136 may include one or more tracking diagnostic processor(s) and may be configured to receive the one or more location signals 134 and the one or more path signals 128 and determine, based at least in part on the location signals 134 and/or the path signals 128, a tracking difference 138 between the path location 140 and the machine location 142. The tracking diagnostic module 136 may be configured to determine, based at least in part on the tracking difference 138, whether there is a tracking problem 144 associated with maneuvering of the machine 102. For example, the tracking diagnostic module 136 may be configured to determine, based at least in part on the tracking difference 138, a frequency of a signal associated with the tracking difference 138 associated with maneuvering the machine 102 and/or a frequency of a signal associated with a yaw rate associated with maneuvering the machine 102, and detect, based at least in part on the frequency of the signal associated with the tracking difference and/or the frequency of the signal associated with a yaw rate, the tracking problem 144. In some examples, the tracking problem detection system 104 may be configured to generate one or more signals indicative of the tracking problem 144, which may be communicated to an output device 146, which may include any device that may use the signals indicative of the tracking problem 144, for example, to communicate an indication of the tracking problem 144 to a person or device that may take one or more corrective actions 148 to mitigate or eliminate the tracking problem 144. For example, the output device 146 may include a device configured to display an image indicative the tracking problem 144 and/or configured to cause the corrective action 148, such as the travel controller 130, which may be, for example, recalibrated based at least in part on the signals indicative of the tracking problem 144. In some examples, the travel controller 130 may be configured to partially control maneuvering of the machine 102 to a location remote from the machine location 142 for service or repair, and/or to communicate the detection of the tracking problem 144 to the location remote from the machine location 142.

Figure 2:
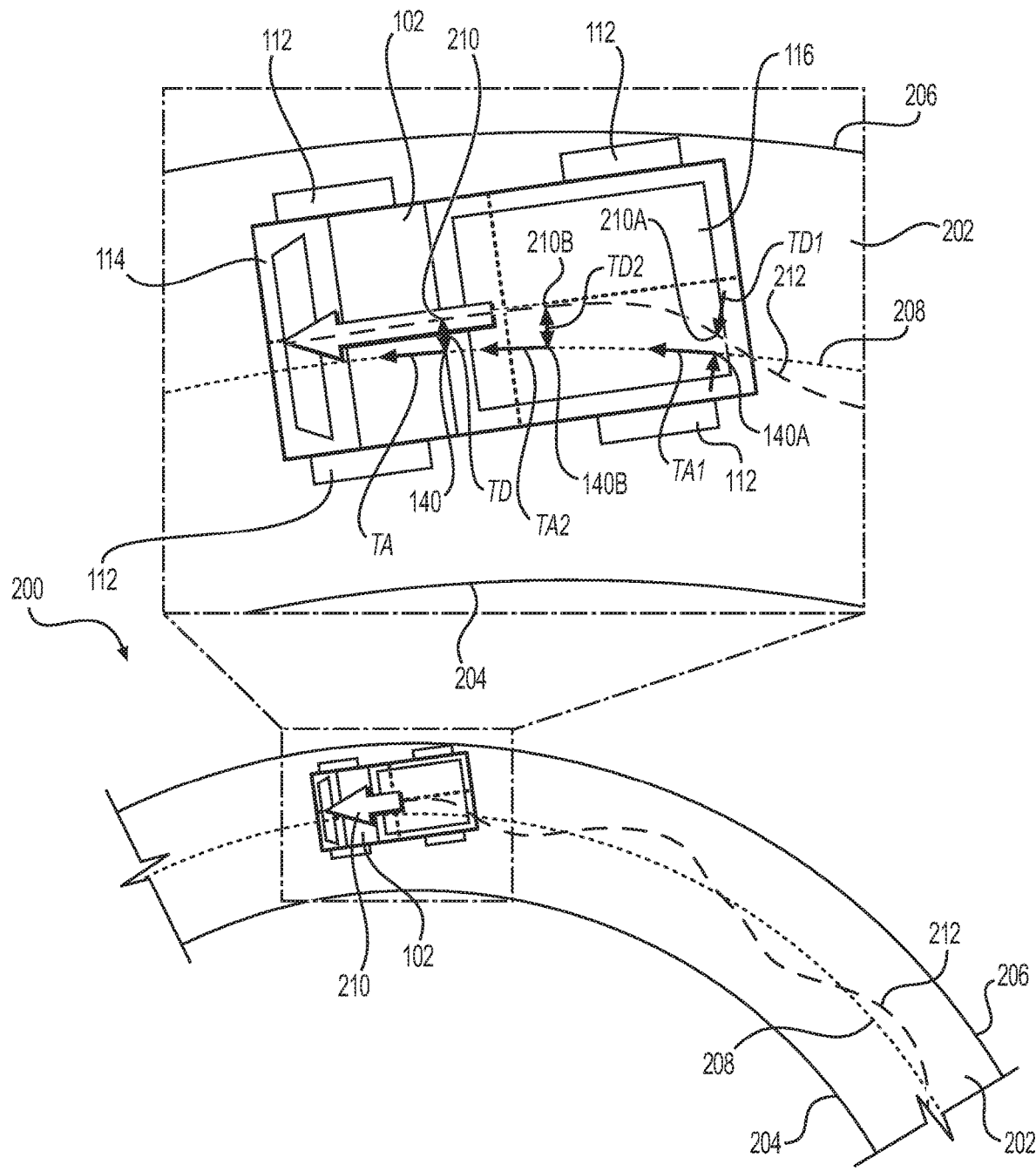
FIG. 2 is a block diagram depicting a schematic top view of an example environment including an example machine exhibiting an example tracking problem.

FIG. 2 is a block diagram depicting a schematic top view of an example environment 200 including an example machine 102 exhibiting an example of a tracking problem 144 (e.g., a tracking error). As shown in FIG. 2, a road 202, which may substantially correspond to the road 118 shown in FIG. 1, is defined by opposing edges 204 and 206, which may be actual or virtual. In some examples, as discussed previously herein, the machine 102 may be controlled, such that the machine 102 is intended to follow a path 208 while maneuvering on the road 202. For example, the machine 102 may include one or more sensors 132 configured to generate one or more location signals 134 indicative of the environment 200, and a travel controller 130 may be configured to determine, based at least in part on the one or more location signals 134, a location 210 of the machine 102 (e.g., the location of a predefined point of the machine 102, such as the center of gravity of the machine 102 or geometric center of the machine 102, for example, relative to a top view of the machine 102) as the machine 102 travels along the path 208. As discussed previously herein, in some examples, the travel controller 130 may be configured to substantially align the location 210 of the machine 102 along the path 208, such that as the machine 102 strays from the path 208, the location 210 of the machine does not align with the path 208. To regain alignment of the location 210 with the path 208, the travel controller 130 causes the machine 102 to alter its direction of travel, so that the location 210 of the machine 102 substantially coincides with the path 208 at the respective locations of the machine 102 as the machine 102 maneuvers according to the path 208. In some examples, the travel controller 130 may be configured maintain a difference between the location 210 of the machine 102 along the path 208 and the corresponding location of the path location 140 at a minimum, for example, within a predetermined threshold difference.

For example, as shown in FIG. 2, a location line 212 represents the continuous location of the machine 102 as it travels along the road 202. The distance between the path 208 and the location line 212 represents the difference in distance between the location 210 of the machine 102 and the path 208 (e.g., the path location 140). In some examples, the distance between the location 210 of the machine 102 and the path 208 is defined by a tracking distance TD between the location 210 of the machine 102 and the path location 140, as determined substantially perpendicular to a tangent TA to the path 208. For example, as shown FIG. 2, as the machine 102 travels along the path 208, a first tracking difference 138A corresponds to a first tracking distance TD1 between a first tangent TA1 and a first location 210A of the machine 102 corresponding to a point where the first tangent TA1 contacts the path 208 (or a point at which the tracking distance TD is at a minimum or a maximum (see, e.g., FIG. 3)), and as the machine 102 continues to travel along the path 208, a second tracking difference 138B corresponds to a second tracking distance TD2 between a second tangent TA2 and a second location 210B of the machine 102 corresponding to a point where the second tangent TA2 contacts the path 208. The travel controller 130, in some examples, may be configured maintain the tracking difference 138 of the machine 102 along the path 208 and the corresponding path location 140 at a minimum, for example, within a predetermined threshold difference. In some examples, the tracking problem detection system 104 may be configured to detect the tracking problem 144 during a state of change of maneuvering the machine 102, for example, while the machine 102 is executing a turn.

An example tracking problem may occur, however, if the travel controller 130 causes the machine 102 to swerve as the machine 102 travels along the path 208, for example, in a manner that results in the machine 102 straying from the path 208 in an undesirable manner. For example, such swerving may result in the machine 102 straying from its intended course, potentially resulting in lane breaches and/or reduced efficiency of operation and degraded performance. Such operation may be caused by, for example, inaccurate calibration of the one or more sensors 132 and/or the travel controller 130, problems with the control software and/or control algorithms associated with the machine 102, mechanical problems with the machine 102, such as uneven inflation of tires, a faulty track in a machine having tracks, a misalignment of the wheels or tracks, etc., and/or problems with the surface of the road (e.g., unevenness of the surface and/or holes and divots).

FIG. 2 schematically illustrates an example of such swerving behavior. In the example shown in FIG. 2, the swerving may occur, such that the machine 102 repeatedly crosses the path 208 provided for the machine 102 to follow in an oscillating manner. For example, rather than following the path 208 closely (e.g., within a predetermined threshold tracking distance), the machine 102 repeatedly crosses the path 208, resulting in the machine 102 swerving as the machine 102 travels along the path 208. This may result in inefficient operation of the machine 102 by causing the machine 102 to travel significantly farther during maneuvering between a departure point and a destination point. In some instances, the swerving may result in the machine 102 approaching and/or crossing the edges 204 and 206 of the road 202, which may result in the machine 102 breaching its travel lane.

Figure 3:
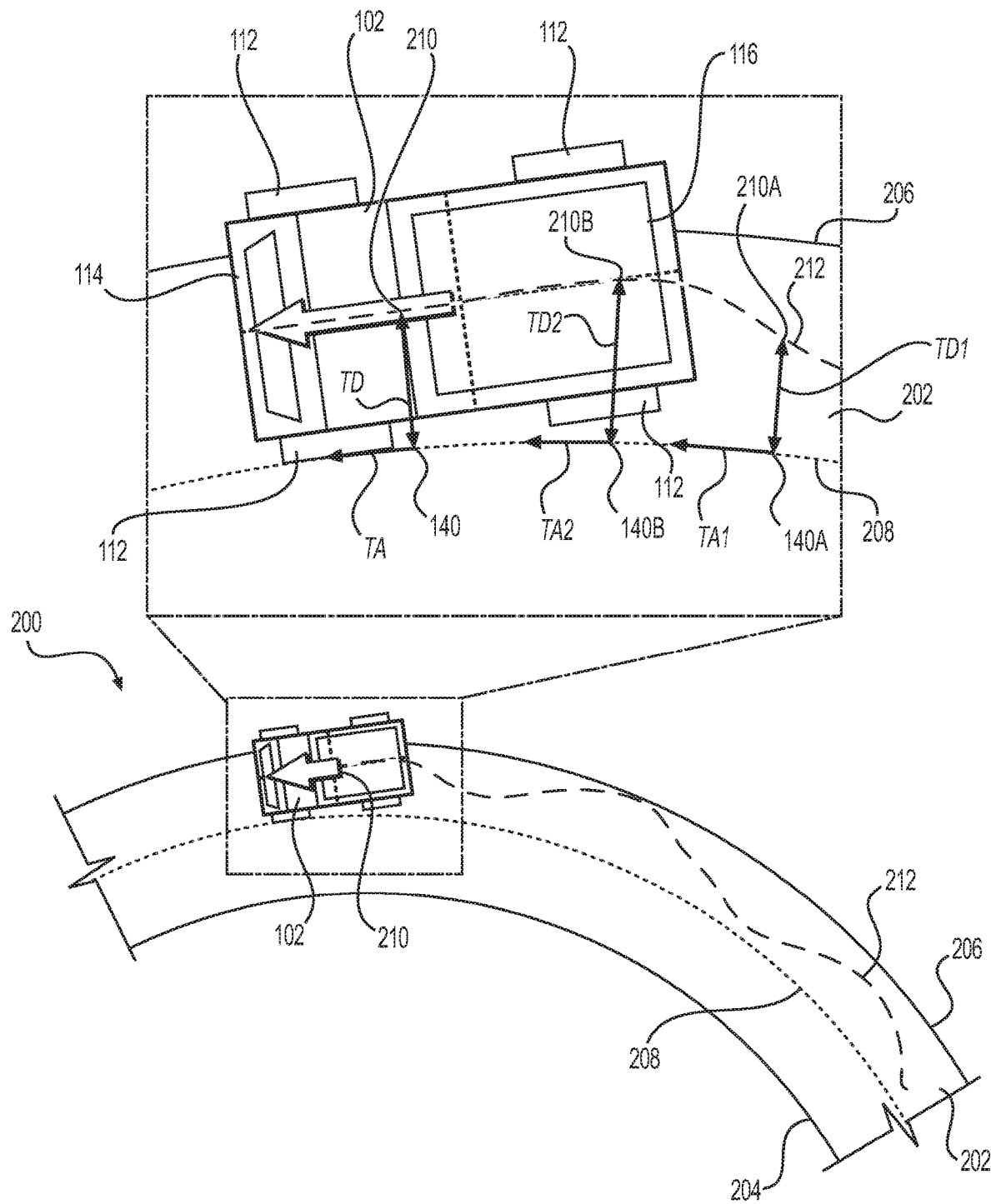
FIG. 3 is a block diagram depicting a schematic top view of an example environment including an example machine exhibiting another example tracking problem.

FIG. 3 is a block diagram depicting a schematic top view of the example environment 200 shown in FIG. 2 including the example machine 102 exhibiting another example of a tracking problem 144. As shown in FIG. 3, the swerving may occur such that the machine 102 does not cross the path 208 (or crosses the path 208 intermittently) while continuing to exhibit an undesirable swerving behavior, such that the location 210 of the machine 102 relative to the path 208 oscillates without crossing the path 208 (or crosses the path 208 intermittently). In some examples, this may result in inefficient operation of the machine 102 by causing the machine 102 to travel significantly farther during maneuvering between a departure point and a destination point. In some instances, the swerving may result in the machine 102 approaching and/or crossing the edges 204 and 206 of the road 202, which may result in the machine 102 breaching its travel lane.

Figure 4:
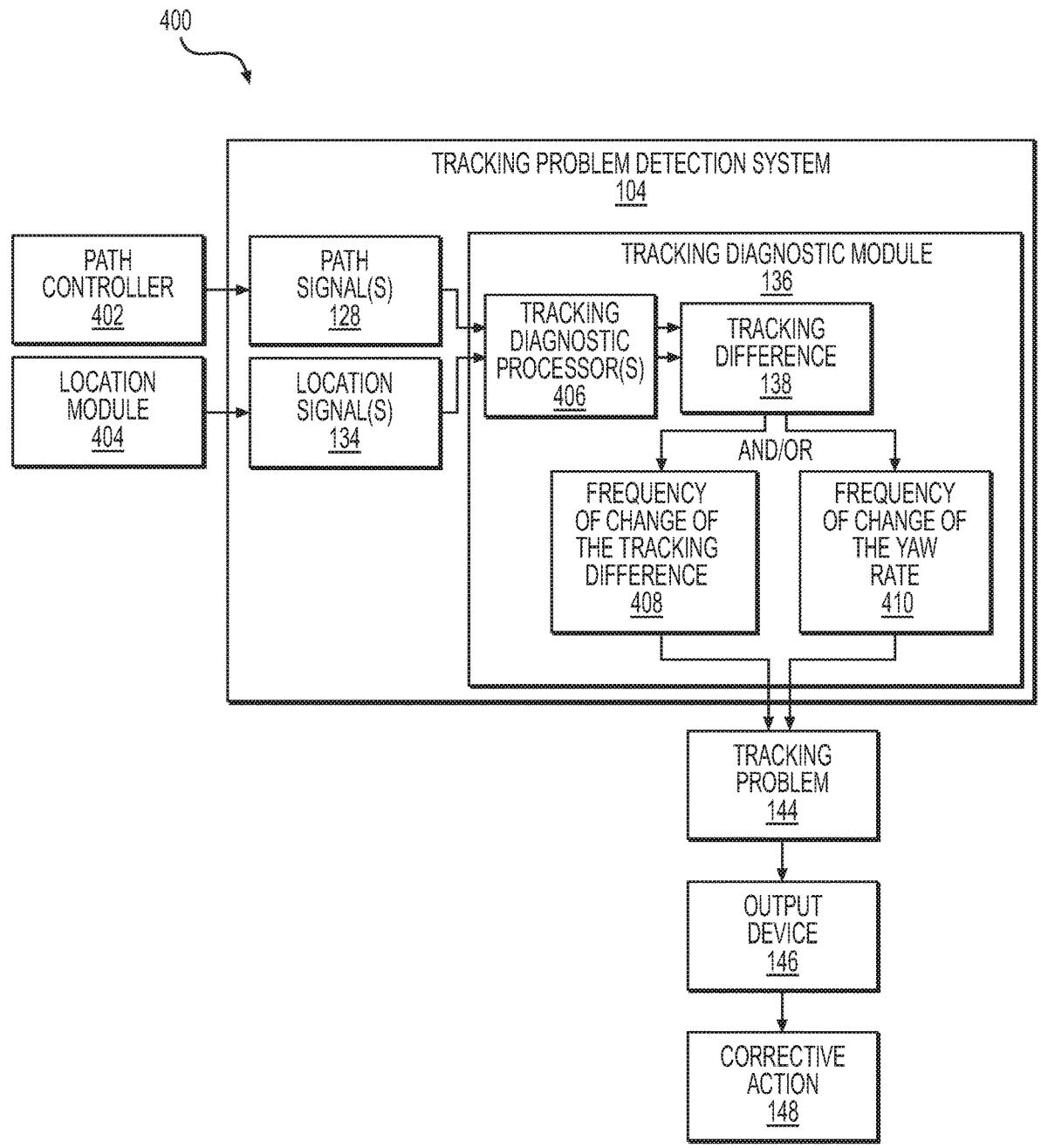
FIG. 4 is a block diagram illustrating an example tracking problem detection system including an example tracking diagnostic module configured to detect a tracking problem based at least in part on a path signal and a location signal.

FIG. 4 is a block diagram 400 illustrating an example tracking problem detection system 104 including an example tracking diagnostic module 136 configured to detect a tracking problem 144 based at least in part on one or more path signals 128 and one or more location signals 134. In the example shown in FIG. 4, the one or more path signals 128 may be generated by a path controller 402, which may receive one or more signals from a remote location indicative of a path for the machine 102 to follow between a departure point and a destination point, for example, as described herein. In some examples, the path controller 402 may be located remotely from the machine 102, and the one or more path signals 128 may be communicated to the tracking problem detection system 104. All or portions of the tracking problem detection system 104 may be located remotely from the machine 102 or carried onboard the machine 102. In some examples, a location module 404 may be configured to determine the location 210 of the machine 102, for example, based on the one or more signals generated by the one or more sensors 132, and the location module 404 may be configured to determine the location 210 of the machine 102 and generate the one or more location signals 134. In the example shown in FIG. 4, the tracking diagnostic module 136 may include one or more tracking diagnostic processors 406 configured to receive the path signal(s) 128 and the location signal(s) 134 and determine the tracking difference 138 based at least in part on the path signal(s) 128 and the location signal(s) 134, for example, as described herein.

As shown in FIG. 4, the tracking diagnostic processor(s) 406 may be configured to evaluate the tracking difference 138, for example, as a function of time and/or frequency, and generate one or more signals indicative of the tracking difference 408 and/or of a yaw rate 410 associated with maneuvering of the machine 102. In some examples, based at least in part on an analysis of a frequency of the signal associated with the tracking difference 408 and/or a frequency of the signal associated with a yaw rate 410, the one or more tracking diagnostic processors 406 may be configured to detect a tracking problem 144 associated with maneuvering of the machine 102. For example, the frequency of the signal associated with the tracking difference 408 and/or the frequency of the signal associated with the yaw rate 410 may be indicative of a tracking problem 144, for example, such as the undesired swerving described herein, as well as other types of tracking problems. For example, the frequency of the signal associated with the tracking difference 408 and/or the frequency of the signal associated with the yaw rate 410 may be greater than or equal to a threshold frequency or threshold yaw rate, respectively, which may be predetermined or calculated in real-time, for example, based at least in part on theoretically- and/or empirically-derived values. In some examples, the tracking diagnostic processor(s) 406 may be configured to apply a fast Fourier transform to the tracking difference 408 and/or the yaw rate 410, and the result may be analyzed, for example, by the tracking diagnostic processor(s) 406 to detect or otherwise identify a tracking problem 144 associated with maneuvering of the machine 102.

In some examples, one or more signals indicative of the tracking problem 144 may be communicated to an output device 146, which may include any device that may use a signal indicative of the tracking problem 144, for example, to communicate an indication of the tracking problem to a person or device that may take one or more corrective actions 148 to mitigate or eliminate the tracking problem 144. For example, the output device 146 may include a device configured to display an image indicative the tracking problem 144 and/or configured to cause the corrective action 148, such as the travel controller 130, which may be, for example, recalibrated based at least in part on the signal(s) indicative of the tracking problem 144. In some examples, the travel controller 130 may be configured to at least partially control maneuvering of the machine 102 to a location remote from the machine location 142 for service or repair, and/or communicate the detection of the tracking problem 144 to the location remote from the machine location 142.

In some examples, the tracking diagnostic processor(s) 406 may be configured to determine a cause associated with the tracking problem 144, for example, based on the tracking difference 138 and/or one or more of the frequency of the signal associated with the tracking difference 408 and/or the frequency of the signal associated with the yaw rate 410. For example, one or more characteristics associated with, and/or derived from, the tracking difference 138, the frequency of the signal associated with the tracking difference 408, and/or the frequency of the signal associated with the yaw rate 410 may be indicative of a particular cause for the tracking problem 144, and the tracking diagnostic processor(s) 406 may be configured to determine one or more causes for the tracking problem 144. In some examples, the one or more characteristics may be determined via comparing the behavior of the machine 102 with testing data and/or historical data, and such testing and/or historical data may be leveraged by an analytical model configured to receive the path signal(s) 128, the location signal(s) 134, and/or other data associated with maneuvering of the machine 102 and identify one or more causes for the tracking problem 144. In some examples, the analytical model may be trained via machine learning, for example, using the testing data and/or the historical data as ground truth for the analytical model.

As shown FIG. 4, in some examples, corrective action 148 may be taken to mitigate or eliminate the tracking problem 144. For example, the output device 146 may be configured to notify a remote service center about the tracking problem 144, so that the corrective action 148 may be taken to mitigate or eliminate the tracking problem 144. In some examples, a mobile service unit may be deployed to service the machine 102 at the machine location 142 or another location at which the mobile service unit may meet the machine 102 and perform the corrective action 148, for example, based on a diagnosis of the cause of the tracking problem 144. For example, one or more of the sensors 132 and/or the travel controller 130 may be recalibrated, and/or the control software and/or control algorithms may be updated, reloaded, and/or reset. In some examples, if the diagnosis indicates that the tracking problem 144 is caused by a mechanical problem associated with the machine 102, the mechanical problem may be corrected. For example, an uninflated tire may be repaired or replaced, inflation pressures associated with the tires may be corrected, misalignment of the wheels 112 or tracks may be corrected, and/or a faulty track may be repaired. In some examples, if the diagnosis indicates a problem with the road, the road may be reconditioned or repaired to mitigate or eliminate the problem, for example, by grading or leveling the road surface, filling holes or divots, etc.

Figure 5:
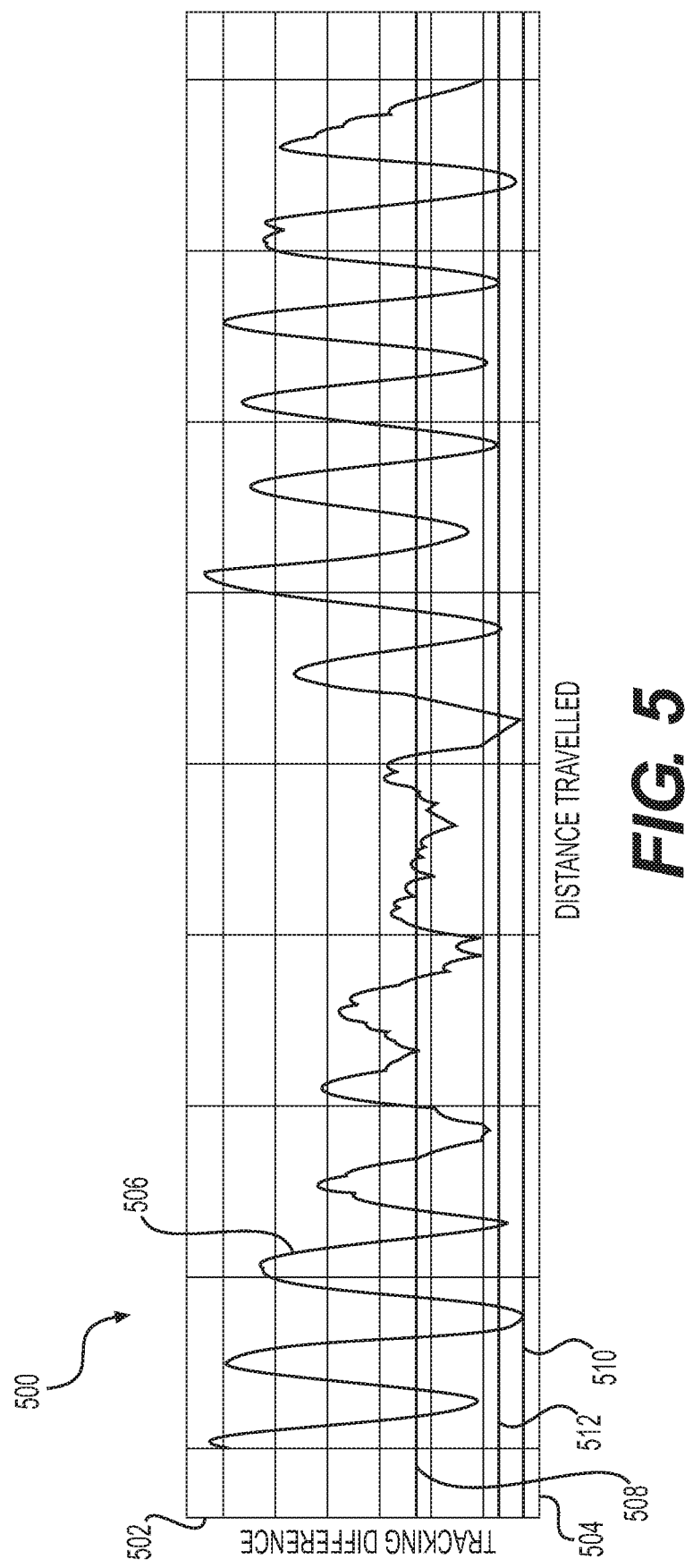
FIG. 5 is a graph showing an example of a tracking difference change as a function of distance traveled by a machine.

FIG. 5 is a graph 500 showing an example of a tracking difference change 502 as a function of distance traveled 504 by a machine. The plot 506 of the tracking difference change 502 shows that the tracking difference 138 fluctuates relative to the path as the machine travels, for example, along a road. For example, as shown in FIG. 5, the tracking difference 138 fluctuates according to a modified sinusoidal profile indicating swerving of the machine as it travels along the road. The plot 506 shown in FIG. 5 may indicate the machine is repeatedly swerving across the path, is swerving without crossing the path, or is swerving and intermittently crossing the path, depending on, for example, the amplitude of the tracking difference 138. For example, if the line 508 on the graph 500 corresponds to the path, then the plot is consistent with the machine repeatedly crossing the path while swerving. If the line 510 on the graph 500 corresponds to the path, then the plot is consistent with the machine swerving without crossing the path. If the line 512 on the graph 500 corresponds to the path, then the plot is consistent with the machine swerving and intermittently crossing the path, depending on, for example, the amplitude of the tracking difference 138. These three different examples of tracking problems 144 may be indicative of different causes, which, in some examples, the tracking problem detection system 104 may be configured to identify, for example, as described above.

Figure 6:
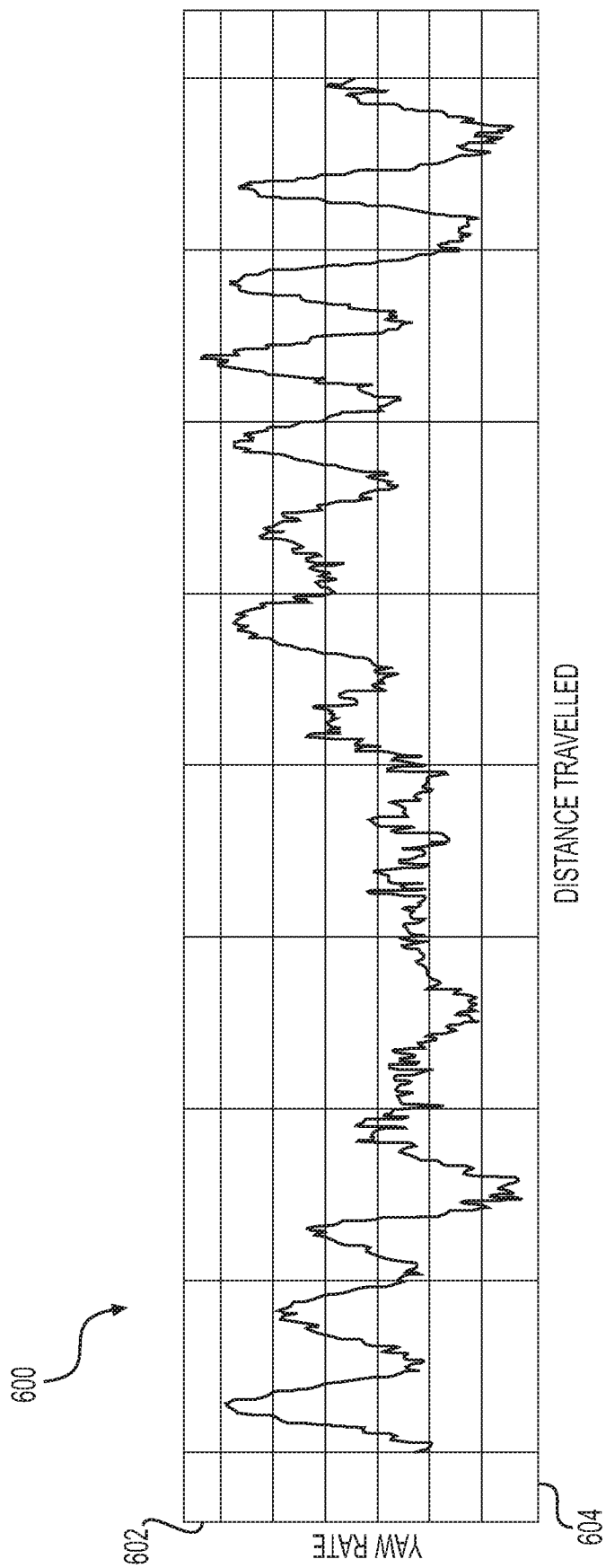
FIG. 6 is a graph showing an example of a yaw rate change as a function of distance traveled by a machine.

FIG. 6 is a graph 600 showing an example of a yaw rate change 602 as a function of distance traveled 604 by a machine. Similar to FIG. 5, the plot 606 of the yaw rate change 602 shows that the yaw rate fluctuates relative to the path as the machine travels, for example, along a road. For example, as shown in FIG. 6, the yaw rate fluctuates according to a modified sinusoidal profile indicating swerving of the machine as it travels along the road. The plot 606 shown in FIG. 6 may indicate the machine is repeatedly swerving across the path, is swerving without crossing the path, or is swerving and intermittently crossing the path. These different examples of tracking problems 144 may be indicative of different causes, which, in some examples, the tracking problem detection system 104 may be configured to identify, for example, as described above.

Figure 7:
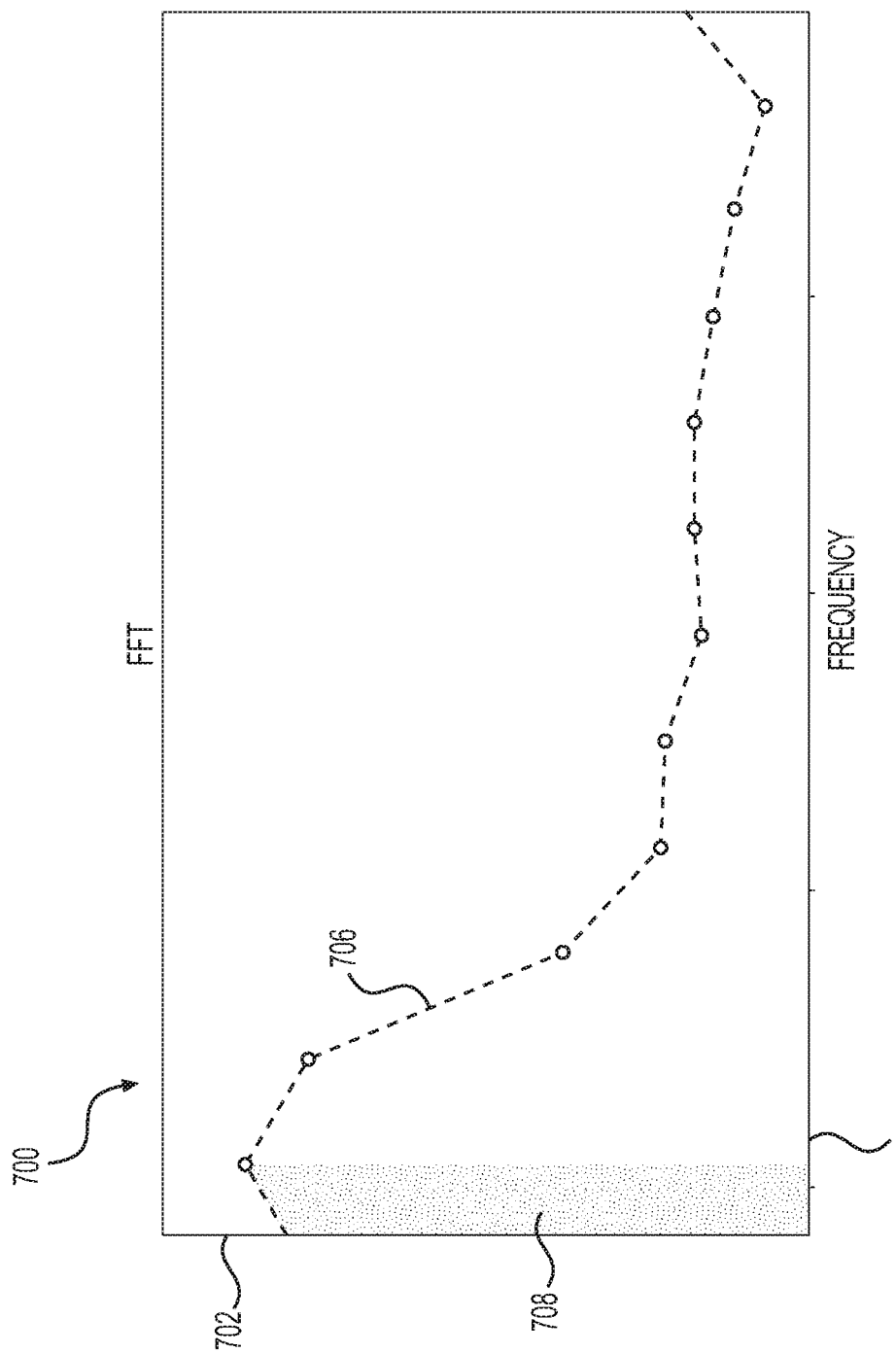
FIG. 7 is a graph showing a fast Fourier transform applied to an example tracking difference change as a function of frequency.

FIG. 7 is a graph 700 showing a fast Fourier transform applied to an example tracking difference 702 as a function of frequency 704. The plot 706 of the tracking difference 702 as a function of frequency 704 shows that certain frequencies are associated with higher amplitudes, for example, as indicated at a portion 708 of the plot 706 closest to the left-hand side of the graph 700. Such an example graph may be used to determine whether the machine is repeatedly swerving across the path, is swerving without crossing the path, or is swerving and intermittently crossing the path, depending on, for example, the profile of the plot 706.

Figure 8:
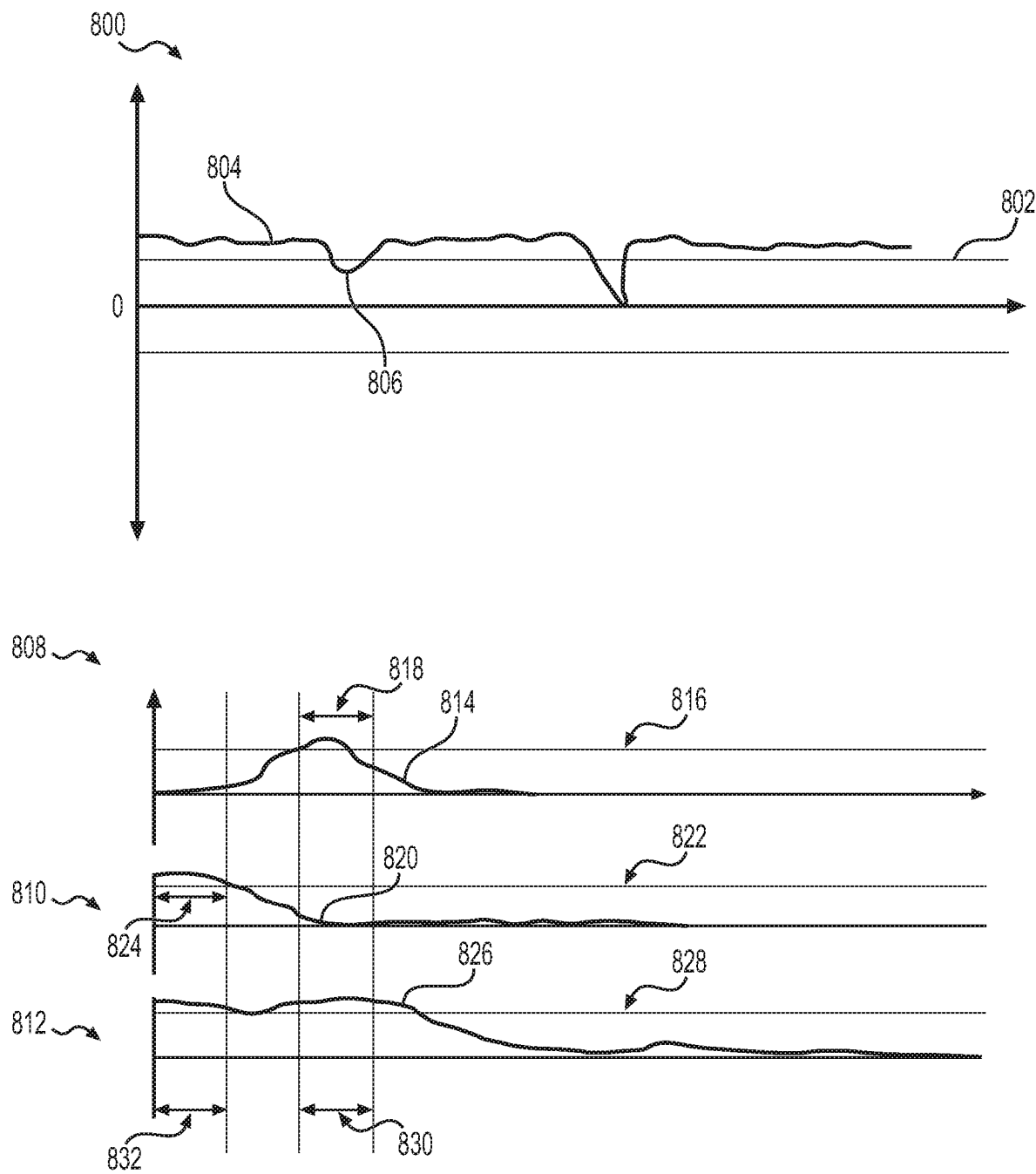
FIG. 8 includes graphs showing signals in the time domain and the frequency domain which may be used to detect swerving and/or constant bias by a machine.

FIG. 8 includes a first graph 800 which may be used for selecting a time period to evaluate a tracking difference signal and/or a yaw rate signal for detecting a tracking problem, such as constant bias, associated with maneuvering of a machine. For instance, constant bias by the machine may result in an amplitude of zero and near-zero frequency components of the signal from the tracking difference and/or yaw rate to be higher than other frequency components of the signals. The first graph 800 illustrates a threshold 802 that may be applied to a signal 804 to detect constant bias by the machine. If the values included in the signal 804 remain above the threshold 802 for at least a minimum amount of time (e.g., 10 seconds, 20 seconds, etc.), the tracking problem detection system 104 may output an alert indicating that the machine is experiencing constant bias, as described herein. At times, values of the signal 804 may be below the threshold 802, such as at a time 806, for example when the machine executes a turn or other type of maneuver. In response to the values of the signal 804 being below the threshold 802, the timing threshold for detecting constant bias may be reset.

FIG. 8 also includes a second graph 808, a third graph 810, and a fourth graph 812, which illustrate how the tracking problem detection system 104 may evaluate swerving and constant bias together. The second graph 808 depicts amplitude versus frequency of a signal 814 derived by applying a fast Fourier transform to a tracking difference as described herein, where the machine is swerving relative to the path location 140. The tracking problem detection system 104 may determine that the machine is swerving by identifying that the values of the signal 814 exceed a threshold amplitude 816 in a frequency range 818 known to correspond to swerving. The third graph 810 depicts amplitude versus frequency of a signal 820 derived by applying a fast Fourier transform to a tracking difference as described herein, where the machine is experiencing constant bias relative to the path location 140. The tracking problem detection system 104 may determine that the machine is experiencing constant bias by identifying that the values of the signal 820 exceed a threshold amplitude 822 in a frequency range 824 known to correspond to constant bias. The fourth graph 812 depicts amplitude versus frequency of a signal 826 derived by applying a fast Fourier transform to a tracking difference as described herein, where the machine is swerving and experiencing constant bias relative to the path location 140. The tracking problem detection system 104 may determine that the machine is swerving and experiencing constant bias by identifying that the values of the signal 826 exceed a threshold amplitude 828 in a frequency range 830 known to correspond to swerving, and a frequency range 832 known to correspond to constant bias.

Applying a fast Fourier transform to a tracking difference or yaw rate over a period of time, such as 20 seconds as described herein, allows the tracking problem detection system 104 to detect frequencies that exceed the amplitude threshold associated with swerving and constant bias, among other tracking problems, while preventing unnecessary alarms that may result from small signal fluctuations that cross the threshold.

Figure 9:
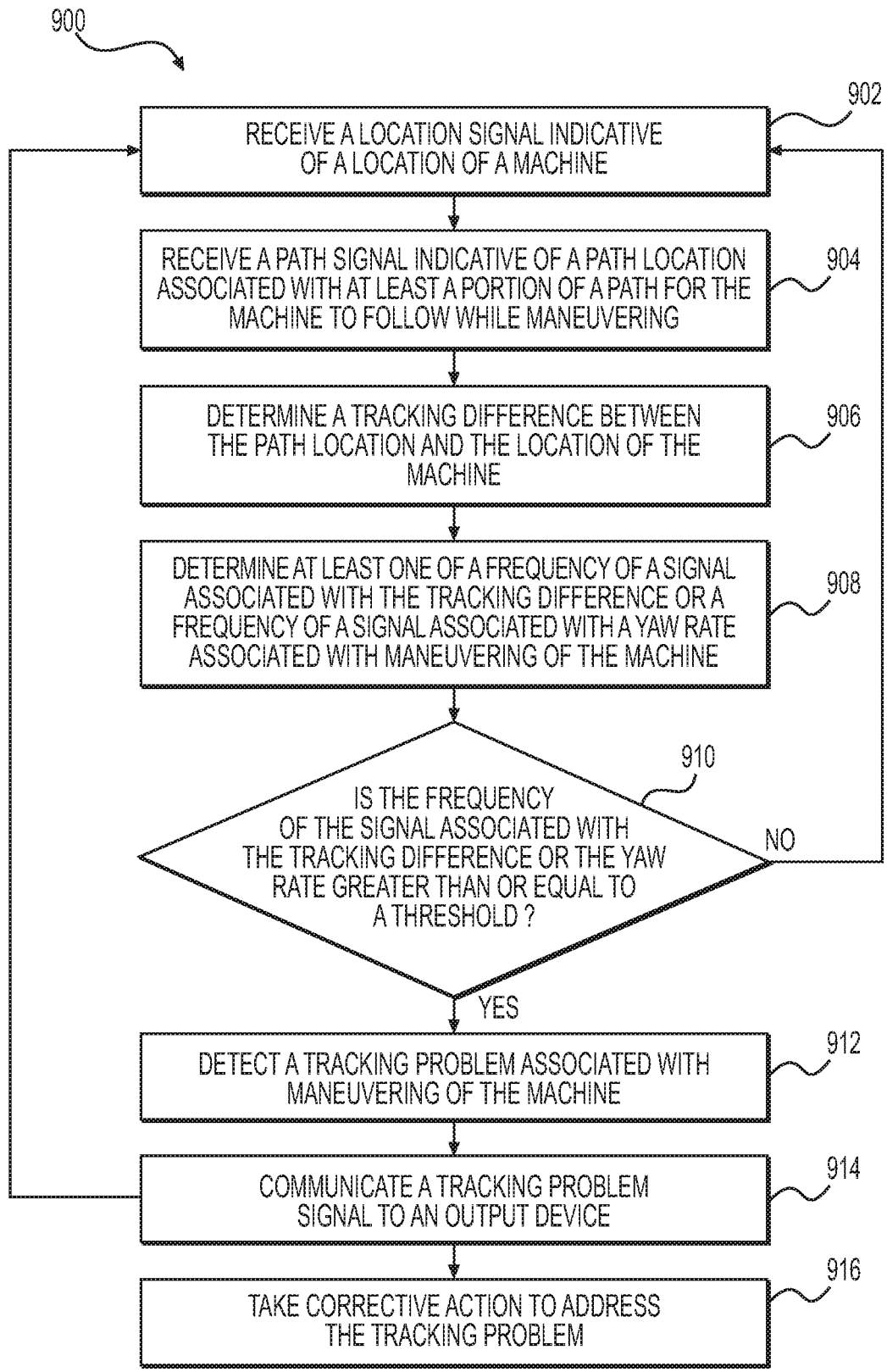
FIG. 9 is an example process for detecting a tracking problem associated with maneuvering of a machine.

FIG. 9 is an example process 900 for detecting a tracking problem associated with maneuvering of a machine. This process 900 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

FIG. 9 illustrates a flow diagram of an example process 900 for detecting a tracking problem associated with maneuvering of a machine, for example, at a worksite. The example process 900, at block 902, may include receiving a location signal indicative of a location of a machine. For example, a tracking diagnostic module including one or more tracking diagnostic processors may be configured to receive a location signal indicative of a location of a machine. In some examples, the location signal may be generated by one or more of a global positioning system (GPS) receiver, one or more object sensors configured to generate one or more location signals indicative of an object in an environment in which the machine is maneuvering, one or more accelerometers, one or more gyroscopes, and/or one or more one inertial measurement units (IMUs).

The example process 900, at block 904, may include receiving a path signal indicative of a path location associated with at least a portion of a path for the machine to follow while maneuvering. For example, a path controller associated with the machine and/or a facility located remotely from the machine may be configured to generate a path signal indicative of a path location associated with at least a portion of a path for the machine to follow while maneuvering from a departure point to a destination point. In some examples, the tracking diagnostic circuitry may be configured to receive the path signal, which may define a discrete portion of a travel path between the two locations.

At block 906, the example process 900 may include determining a tracking difference between the path location and the location of the machine. For example, the tracking diagnostic module may be configured to determine the tracking difference. In some examples, the machine defines a location (e.g., a location of at least a portion of the machine), and the tracking difference may include a tracking distance between the location of the machine and the path location as determined substantially perpendicular to a tangent to the path corresponding to the location of the machine. In some examples, the location of the machine may repeatedly cross the path, for example, as the machine travels along the path exhibiting a swerving behavior. In some examples, the location of the machine may substantially remain on one side of the path, for example, as the machine travels along the path exhibiting a swerving behavior and an offset error. In some examples, the location of the machine may intermittently cross the path, for example, as the machine travels along the path exhibiting a swerving behavior and an offset error.

The example process 900, at 908, may also include determining at least one of a frequency of a signal associated with the tracking difference or a frequency of a signal associated with a yaw rate associated with maneuvering of the machine. For example, the tracking diagnostic module may be configured to detect, based at least in part on one or more of the frequency of the signal associated with the tracking difference or the frequency of the signal associated with a yaw rate, a tracking problem associated with maneuvering of the machine.

At block 910, the example process 900 may include determining whether the frequency of the signal associated with the tracking difference or the frequency of the signal associated with the yaw rate is greater than or equal to a threshold frequency or a threshold yaw rate. If the frequency of the signal associated with the tracking difference is not greater than or equal to the threshold frequency, or the frequency of the signal associated with the yaw rate is not greater than or equal to the threshold yaw rate, the process 900 may return to block 902, and the process 900 may be repeated until the frequency of the signal associated with the tracking difference or the frequency of the signal associated with the yaw rate is greater than or equal to the corresponding thresholds. By using the threshold frequency and/or threshold yaw rate, minor diversions or digressions from the path location may be ignored. For example, the tracking diagnostic module may be configured to detect, based at least in part on the frequency of the signal associated with the tracking difference and/or the frequency of the signal associated with a yaw rate, a tracking problem associated with maneuvering of the machine. In some examples, the tracking diagnostic module may be configured to perform a Fourier transformation on the tracking difference and/or the yaw rate, which may be analyzed to detect a tracking problem.

If at block 910 the frequency of the signal associated with the tracking difference or the frequency of the signal associated with the yaw rate is greater than or equal to a threshold frequency and/or threshold yaw rate, respectively, the process 900, at block 912, may include detecting a tracking problem associated with maneuvering of the machine. For example, the tracking diagnostic module may be configured to detect the tracking problem.

The example process 900, at block 914, may include communicating a tracking problem signal to an output device. For example, the output device may include any device configured to display an image indicative the tracking problem and/or configured to cause corrective action, such as a travel controller, which may be updated, recalibrated, and/or reset based at least in part on the tracking problem. In some examples of the process 900, once the presence of the tracking problem has been detected and/or communicated to the output device, the process 900 may include returning to block 902.

At block 916 the example process 900 may include taking corrective action to address the tracking problem, for example, as described herein.

INDUSTRIAL APPLICABILITY

The systems and methods described herein may be used in association with operation of machines at a worksite, for example, to improve the efficiency and performance of the machines. For example, a machine may be configured to operate at the worksite, including maneuvering at the worksite to perform tasks associated with the worksite. The systems and methods described herein may be used for detecting tracking problems associated with maneuvering the machine through a worksite, for example, a mining worksite. In some examples, the systems and methods may be used to detect tracking problems, such as a swerving behavior associated with maneuvering semi- or fully-autonomous machines along a route between a departure point and a destination point at the worksite. For example, due to calibration problems, control problems, and/or physical problems associated with the machine or the route, the machine may exhibit excessive swerving as it travels along the route. According to at least some examples described herein, the system and methods may be configured to detect such tracking problems and, in some examples, initiate a corrective action to mitigate or eliminate the tracking problem, for example, as described herein.

In some examples, the systems may include a tracking diagnostic module configured to receive a location signal indicative of a location of the machine and a path signal indicative of a path location associated with at least a portion of a path for the machine to follow while maneuvering. The location signal may include any signal indicative of the location of the machine relative to the path location. The path signal may be any signal indicative of at least a portion of the path along which the machine is intended to travel, which may be provided by a travel controller. In some examples, the systems may be configured to determine a tracking difference between the path location and the location of the machine, and determine, based at least in part on the tracking difference, a frequency of a signal associated with the tracking difference associated with maneuvering the machine and/or a frequency of a signal associated with a yaw rate associated with maneuvering the machine. The systems and methods may be configured to detect, based at least in part on the frequency of the signal associated with the tracking difference and/or the frequency of the signal associated with the yaw rate, a tracking problem associated with maneuvering the machine, such as a tracking error. For example, due to control and/or physical problems associated with the machine, the machine may exhibit a tendency to stray from the path provided for the machine to follow, for example, in a swerving manner, which may result in the machine heading off-course, breaching lane boundaries (actual and/or virtual), and/or operating in an inefficient manner. In some examples, the swerving may occur, such that the machine repeatedly crosses the path provided for the machine to follow in an oscillating manner and/or such that the machine does not cross the path provided for the machine to follow, but such that the location of the machine relative to the path oscillates without crossing the path. At least some examples of the systems described herein may be able to detect such tracking problems, and corrective action may be taken to mitigate or eliminate the detected tracking problem, which may result in improving the performance and/or efficiency associated with operation of the machine.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A tracking problem detection system for a machine comprising:
   tracking diagnostic circuitry comprising one or more tracking diagnostic processors configured to:
      receive a location signal indicative of a location of the machine;
      receive a path signal indicative of a path location associated with at least a portion of a path for the machine to follow while maneuvering;
      determine a tracking difference between the path location and the location of the machine;
      determine, based at least in part on the tracking difference, at least one of a first frequency of a first signal associated with the tracking difference or a second frequency of a second signal associated with a yaw rate associated with maneuvering of the machine; and
      detect, based at least in part on at least one of the first frequency or the second frequency, a tracking problem preventing a travel controller of the machine from maneuvering the machine to substantially align the location of the machine along the path during travel of the machine.

2. The system of claim 1, wherein detecting the tracking problem comprises determining that the at least one of the first frequency or the second frequency is equal to or greater than a threshold.

3. The system of claim 1, wherein the tracking difference comprises a tracking distance between the location of the machine and the path location as determined substantially perpendicular to a tangent to the path.

4. The system of claim 1, wherein the tracking problem causes the location of the machine to substantially remain on one side of the path, or to repeatedly cross the path.

5. The system of claim 1, wherein the location signal is generated by at least one of a global positioning system (GPS) receiver, at least one object sensor configured to generate a signal indicative of an object in an environment in which the machine is maneuvering, at least one accelerometer, at least one gyroscope, or at least one inertial measurement unit (IMU).

6. The system of claim 1, wherein the one or more tracking diagnostic processors are configured to perform a Fourier transformation on the at least one of the tracking difference or the yaw rate.

7. The system of claim 1, wherein detecting the tracking problem occurs during a state of change of maneuvering of the machine.

8. The system of claim 1, wherein the path is a travel path that extends between a departure point and a destination point, and the path signal defines a discrete portion of the travel path between the departure point and the destination point.

9. The system of claim 1, wherein the one or more tracking diagnostic processors are further configured to determine a cause of the tracking problem, based on one or more characteristics of at least one of the tracking difference, the first frequency, or the second frequency.

10. A method for detecting a tracking problem associated with maneuvering of a machine, the method comprising:
   receiving a location signal indicative of a location of the machine;
   receiving a path signal indicative of a path location associated with at least a portion of a path for the machine to follow while maneuvering;
   determining a tracking difference between the path location and the location of the machine;
   determining, based at least in part on the tracking difference, at least one of a first frequency of a first signal associated with the tracking difference or a second frequency of a second signal associated with a yaw rate associated with maneuvering of the machine; and
   detecting, based at least in part on at least one of the first frequency or the second frequency, the tracking problem, wherein the tracking problem prevents a travel controller of the machine from maneuvering the machine to substantially align the location of the machine along the path during travel of the machine.

11. The method of claim 10, wherein detecting the tracking problem comprises determining that the at least one of the first frequency or the second frequency is equal to or greater than a threshold.

12. The method of claim 10, wherein the machine defines a center, and determining the tracking difference comprises determining a tracking distance between the center of the machine and the path location as determined substantially perpendicular to a tangent to the path.

13. The method of claim 10, wherein the tracking problem causes the location of the machine to substantially remain on one side of the path, or to repeatedly cross the path.

14. The method of claim 10, wherein receiving the location signal comprises receiving the location signal from at least one of a global positioning system (GPS) receiver, at least one object sensor configured to generate a signal indicative of an object in an environment in which the machine is maneuvering, at least one accelerometer, at least one gyroscope, or at least one inertial measurement unit (IMU).

15. The method of claim 10, wherein detecting the tracking problem comprises performing a Fourier transformation on the at least one of the tracking difference or the yaw rate.

16. The method of claim 10, wherein detecting the tracking problem comprises detecting the tracking problem during a state of change of maneuvering of the machine.

17. The method of claim 10, further comprising recalibrating, in response to detecting the tracking problem, the travel controller of the machine based at least on part on the first signal or the second signal.

18. A machine comprising:
   a chassis;
   a travel controller coupled to the chassis, the travel controller being configured to control maneuvering of the machine; and
   tracking diagnostic circuitry coupled to the chassis, the tracking diagnostic circuitry comprising one or more tracking diagnostic processors configured to:
      receive a location signal indicative of a location of the machine;
      receive a path signal indicative of a path location associated with at least a portion of a path for the machine to follow while maneuvering;
      determine a tracking difference between the path location and the location of the machine;
      determine, based at least in part on the tracking difference, at least one of a first frequency of a first signal associated with the tracking difference or a second frequency of a second signal associated with a yaw rate associated with maneuvering of the machine; and
      detect, based at least in part on at least one of the first frequency or the second frequency, a tracking problem preventing the travel controller from maneuvering the machine to substantially align the location of the machine along the path during travel of the machine.

19. The machine of claim 18, wherein detecting the tracking problem comprises determining that the at least one of the first frequency or the second frequency is equal to or greater than a threshold.

20. The machine of claim 18, wherein the one or more tracking diagnostic processors are configured to perform a Fourier transformation on the at least one of the tracking difference or the yaw rate.

* * * * *